United States Patent
Beutler et al.

(10) Patent No.: US 11,519,542 B2
(45) Date of Patent: Dec. 6, 2022

(54) COUPLING ASSEMBLY FOR PIPES

(71) Applicant: Georg Fischer Harvel LLC, Little Rock, AR (US)

(72) Inventors: Michael Paul Beutler, Cabot, AR (US); Nicholas Bryant Peters, Benton, AR (US)

(73) Assignee: Georg Fischer Harvel LLC, Little Rock, AR (US)

( * ) Notice: Subject to any disclaimer, the term of this patent is extended or adjusted under 35 U.S.C. 154(b) by 39 days.

(21) Appl. No.: 17/151,304

(22) Filed: Jan. 18, 2021

(65) Prior Publication Data

US 2022/0228683 A1 Jul. 21, 2022

(51) Int. Cl.
*F16L 17/04* (2006.01)
*F16L 37/248* (2006.01)
*F16L 37/107* (2006.01)

(52) U.S. Cl.
CPC ............ *F16L 37/248* (2013.01); *F16L 17/04* (2013.01); *F16L 37/107* (2013.01); *Y10T 29/49826* (2015.01)

(58) Field of Classification Search
CPC ....... F16L 17/04; F16L 19/061; F16L 19/065; F16L 37/10; F16L 37/105; F16L 37/107; F16L 37/24; F16L 37/248; F16L 19/005
USPC .......................... 285/373, 419, 361
See application file for complete search history.

(56) References Cited

U.S. PATENT DOCUMENTS

| 591,828 | A | * | 10/1897 | Duncan | 285/373 |
| 1,725,713 | A | * | 8/1929 | Jobe | 285/419 |
| 3,479,066 | A | * | 11/1969 | Gittleman | 285/373 |
| 5,098,134 | A | * | 3/1992 | Monckton | |
| 7,017,951 | B2 | * | 3/2006 | Spears | |
| 2008/0007048 | A1 | * | 1/2008 | Benoit | F16L 19/061 |

(Continued)

FOREIGN PATENT DOCUMENTS

DE 3743170 C * 5/1989 ............ F16L 19/005

OTHER PUBLICATIONS

Polyvinyl Chloride. [online]. Wikipedia. Retrieved from the Internet:<URL:https://en.wikipedia.org/wiki/Polyvinyl_chloride#Properties> (Year: 2022).*

*Primary Examiner* — Zachary T Dragicevich
*Assistant Examiner* — William S. Choi
(74) *Attorney, Agent, or Firm* — Harness, Dickey & Pierce, P.L.C.

(57) ABSTRACT

A coupling assembly includes a locking collar, a gasket, and a retaining sleeve. The locking collar includes a body and external threads. The external threads are formed on an outer circumferential surface of the body. The gasket is positioned between first and second pipes, and the locking collar. The retaining sleeve includes internal threads formed in an inner circumferential surface of the retaining sleeve. Each internal thread is configured to receive a respective external thread of the locking collar. The retaining sleeve is rotatable between an unlocked position in which the gasket seal is disengaged from the locking collar and the first and second pipes, and a locked position in which the external threads and the internal threads cooperate to move the retaining sleeve axially along the locking collar so that the gasket seal is engaged with the locking collar and the first and second pipes.

18 Claims, 17 Drawing Sheets

(56) References Cited

U.S. PATENT DOCUMENTS

2010/0117360 A1* 5/2010 Chan .......................... 285/373
2012/0217743 A1* 8/2012 Parisi ..................... F16L 17/04
                                                                         285/373

* cited by examiner

COUPLING ASSEMBLY FOR PIPES

FIELD

The present disclosure relates to a coupling assembly for pipes.

BACKGROUND

This section provides background information related to the present disclosure and is not necessarily prior art.

Couplers allow multiple pipes to be connected to each other for various piping applications. Conventional couplers have various drawbacks such as requiring mechanical bonding to the pipes, being time consuming to install, and being made of metal that corrodes. The teachings of the present disclosure provide a coupling assembly that is simple to install, is made of a light-weight polymeric material, and does not require mechanical bonding to the pipes.

SUMMARY

This section provides a general summary of the disclosure, and is not a comprehensive disclosure of its full scope or all of its features.

In one form, the present disclosure discloses a coupling assembly for attaching a first pipe and a second pipe to each other. The coupling assembly includes an annular locking collar, a gasket, and an annular retaining sleeve. The locking collar includes a body and a plurality of external threads. The plurality of external threads are formed on an outer circumferential surface of the body. The gasket is positioned between the first and second pipes, and the locking collar. The retaining sleeve surrounds the locking collar and includes a plurality of internal threads formed in an inner circumferential surface of the retaining sleeve. Each internal thread configured to receive a respective external thread of the locking collar. The retaining sleeve is rotatable between an unlocked position in which the gasket seal is disengaged from the locking collar and the first and second pipes, and a locked position in which the external threads and the internal threads cooperate to move the retaining sleeve axially along the locking collar so that the gasket seal is engaged with the locking collar and the first and second pipes.

In some configurations of the coupling assembly of the above paragraph, a nub is formed on the inner circumferential surface of the retaining sleeve and a plurality of grooves are formed in the outer circumferential surface of the body. The nub engages the outer circumferential surface of the body when the retaining sleeve is in the unlocked position and is received in one groove of the plurality of grooves when the retaining sleeve is in the locked position.

In some configurations of the coupling assembly of any one or more of the above paragraphs, the retaining sleeve is allowed to move in an axial direction relative to the locking collar when the nub engages the outer circumferential surface and is prevented from moving in the axial direction relative to the locking collar when the nub is in the groove.

In some configurations of the coupling assembly of any one or more of the above paragraphs, the outer circumferential surface of the body of the locking collar and the inner circumferential surface of the retaining sleeve are tapered.

In some configurations of the coupling assembly of any one or more of the above paragraphs, when the retaining sleeve is rotated from the unlocked position toward the locked position, the tapered outer circumferential surface moves along the tapered inner circumferential surface which forces the locking collar radially inwardly so that the gasket seal is engaged with the locking collar and the first and second pipes.

In some configurations of the coupling assembly of any one or more of the above paragraphs, the locking collar and the retaining sleeve are made of a polymeric material.

In some configurations of the coupling assembly of any one or more of the above paragraphs, the locking collar includes an upper shell and a lower shell that cooperate to form a circular shape. The upper shell and the lower shell are snap fit to each other.

In some configurations of the coupling assembly of any one or more of the above paragraphs, the plurality of external threads and the plurality of internal threads are arcuate.

In another form, the present disclosure discloses a coupling assembly for attaching a first pipe and a second pipe to each other. The coupling assembly includes an annular locking collar, a gasket, and an annular retaining sleeve. The locking collar includes a body, a plurality of arcuate external threads, and a plurality of axially extending grooves. The external threads are formed on a tapered outer circumferential surface of the body and the grooves are formed in the tapered outer circumferential surface of the body. The gasket is positioned between the first and second pipes, and the locking collar. The retaining sleeve surrounds the locking collar and includes a plurality of arcuate internal threads and an axially extending protuberance. The internal threads are formed in a tapered inner circumferential surface of the retaining sleeve and configured to receive respective external threads of the locking collar and the protuberance is formed on the inner circumferential surface of the retaining sleeve. The retaining sleeve is rotatable between an unlocked position in which the gasket seal is disengaged from the locking collar and the first and second pipes, and a locked position in which the external threads and the internal threads cooperate to move the retaining sleeve axially along the locking collar so that the gasket seal is engaged with the locking collar and the first and second pipes. The protuberance engages the outer circumferential surface of the body when the retaining sleeve is in the unlocked position and is received in one groove of the plurality of grooves when the retaining sleeve is in the locked position. When the retaining sleeve is rotated from the unlocked position toward the locked position, the tapered outer circumferential surface moves along the tapered inner circumferential surface which forces the locking collar radially inwardly so that the gasket seal is engaged with the locking collar and the first and second pipes.

In some configurations of the coupling assembly of the above paragraph, the retaining sleeve is allowed to move in an axial direction relative to the locking collar when the protuberance engages the outer circumferential surface and is prevented from moving in the axial direction relative to the locking collar when the protuberance is in the groove.

In some configurations of the coupling assembly of any one or more of the above paragraphs, when the retaining sleeve is in the locked position, the protuberance and the second groove are interference fit.

In some configurations of the coupling assembly of any one or more of the above paragraphs, the locking collar includes an upper shell and a lower shell that cooperate to form a circular shape. The upper shell and the lower shell are supported by the retaining sleeve.

In some configurations of the coupling assembly of any one or more of the above paragraphs, the plurality of grooves are positioned at an axial end of the body of the locking collar and the protuberance is positioned at an axial end of the retaining sleeve.

In some configurations of the coupling assembly of any one or more of the above paragraphs, the external threads include a first end and a second end and the locking collar includes a first axial end and a second axial end. The external threads extend from the first axial end of the locking collar toward the second axial end of the locking collar as the external threads extend from the first end toward the second end.

In yet another form, a method for attaching a first pipe and a second pipe to each other is disclosed. The method includes providing a gasket between the first pipe and the second pipe; providing a locking collar around the gasket; sliding a retaining sleeve over the locking collar; and rotating the retaining sleeve between an unlocked position in which the gasket seal is disengaged from the locking collar and the first and second pipes, and a locked position in which the gasket seal is engaged with the locking collar and the first and second pipes. The locking collar includes a body and a plurality of external threads formed on an outer circumferential surface of the body. The retaining sleeve includes a plurality of internal threads formed in an inner circumferential surface of the retaining sleeve and configured to receive respective external threads of the locking collar. The external threads and the internal threads cooperate to move the retaining sleeve axially along the locking collar when retaining sleeve is rotated from the unlocked position toward the locked position.

In some configurations of the method of the above paragraph, a nub is formed on the inner circumferential surface of the retaining sleeve and a plurality of grooves are formed in the outer circumferential surface of the body. The nub engages an outer circumferential surface of the body when the retaining sleeve is in the unlocked position and is received in a second groove of the plurality of grooves when the retaining sleeve is in the locked position.

In some configurations of the method of any one or more of the above paragraphs, the retaining sleeve is allowed to move in an axial direction relative to the locking collar when the nub engages the outer circumferential surface and is prevented from moving in the axial direction relative to the locking collar when the nub is in the groove.

In some configurations of the method of any one or more of the above paragraphs, the outer circumferential surface of the body of the locking collar and the inner circumferential surface of the retaining sleeve are tapered.

In some configurations of the method of any one or more of the above paragraphs, when the retaining sleeve is rotated from the unlocked position toward the locked position, the tapered outer circumferential surface moves along the tapered inner circumferential surface which forces the locking collar radially inwardly so that the gasket seal is engaged with the locking collar and the first and second pipes.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
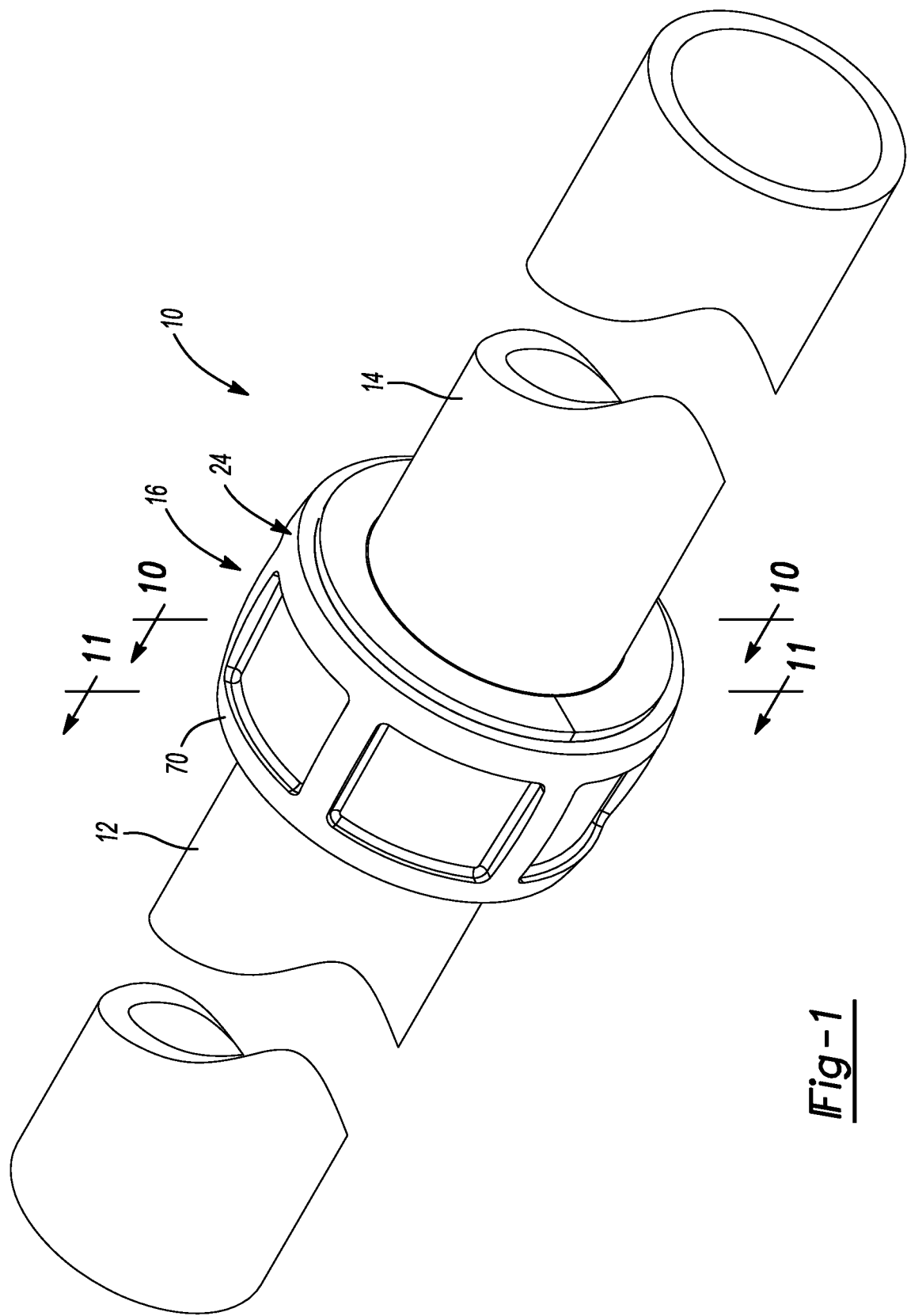
FIG. 1 is a perspective view of a first pipe and a second pipe attached via a coupling assembly according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-13, a pipe assembly 10 is provided. The pipe assembly 10 includes a first pipe 12, a second pipe 14, and a coupler or coupling assembly 16. The first and second pipes 12, 14 are securely and sealingly attached to each other via the coupling assembly 16. The first and second pipes 12, 14 are tubular-shaped and may be made out of a polyvinylchloride (PVC), polyethylene (PE), engineered PVC, or other suitable polymeric material, for example. The first and second pipes 12, 14 define an opening 18 for fluid to flow therethrough.

The coupling assembly 16 attaches the first pipe 12 and the second pipe 14 to each other and includes a gasket 20, an annular locking collar 22, and an annular retaining sleeve 24. With reference to FIGS. 2-4 and 7-13, the gasket 20 is annular-shaped and includes a cross-section that is T-shaped. The gasket 20 also includes a body 26 and a partition 28. The body 26 is positioned between the first and second pipes 12, 14, and the locking collar 22.

Figure 7:
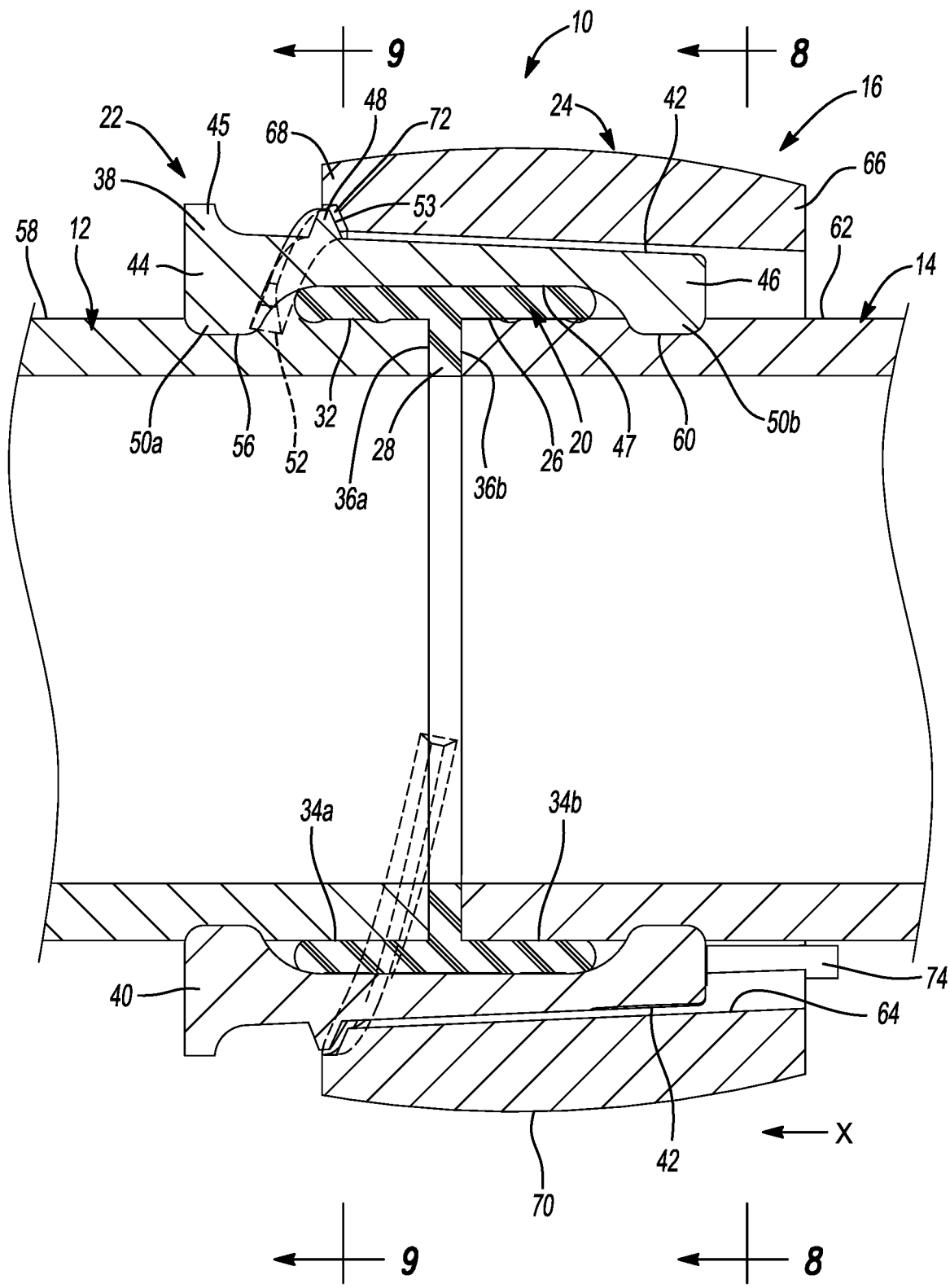
FIG. 7 is a cross-sectional view of the coupling assembly in an unlocked position.
Figure 8:
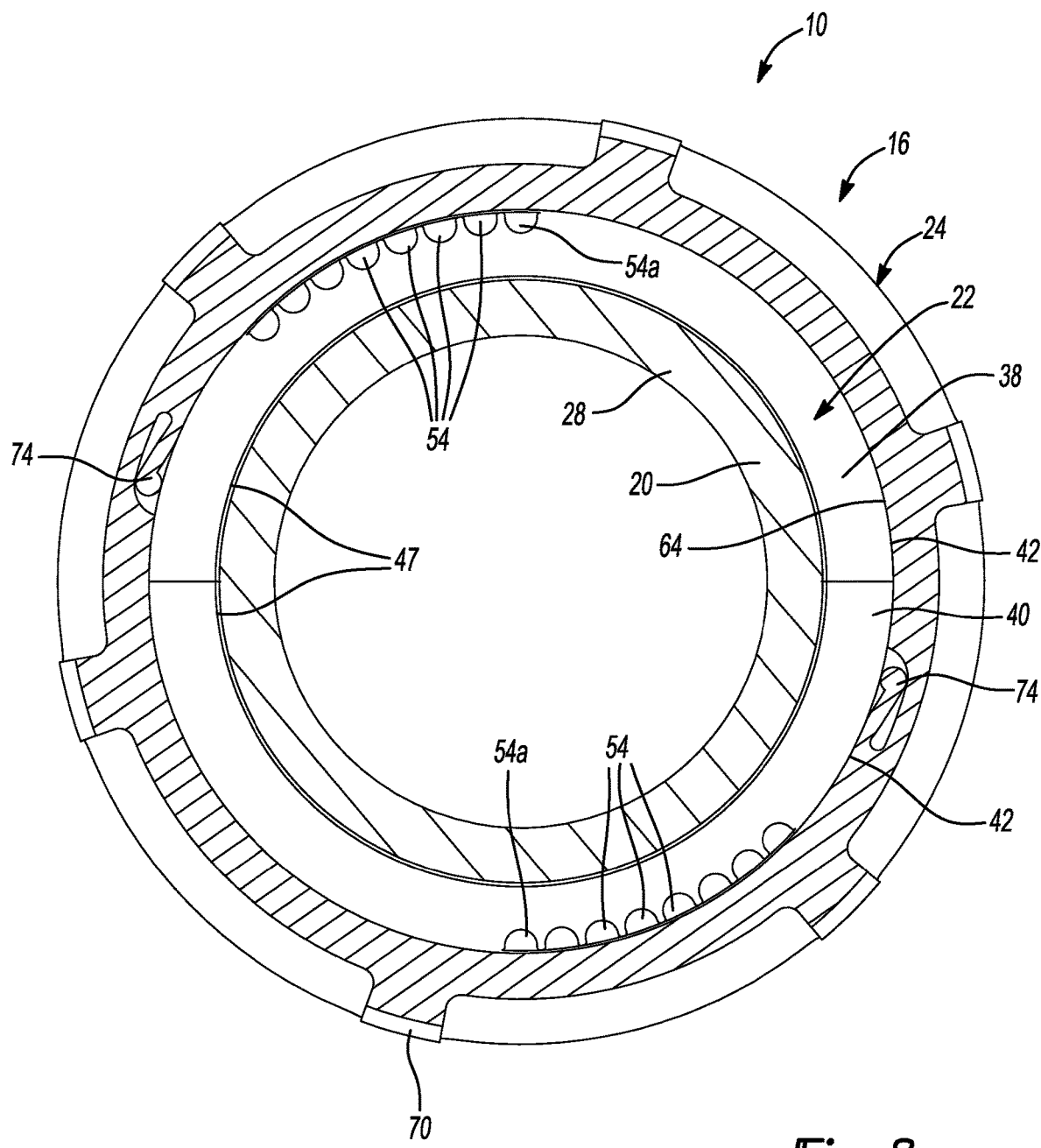
FIG. 8 is a cross-sectional view of the coupling assembly taken along line 8-8 of FIG. 7.
Figure 9:
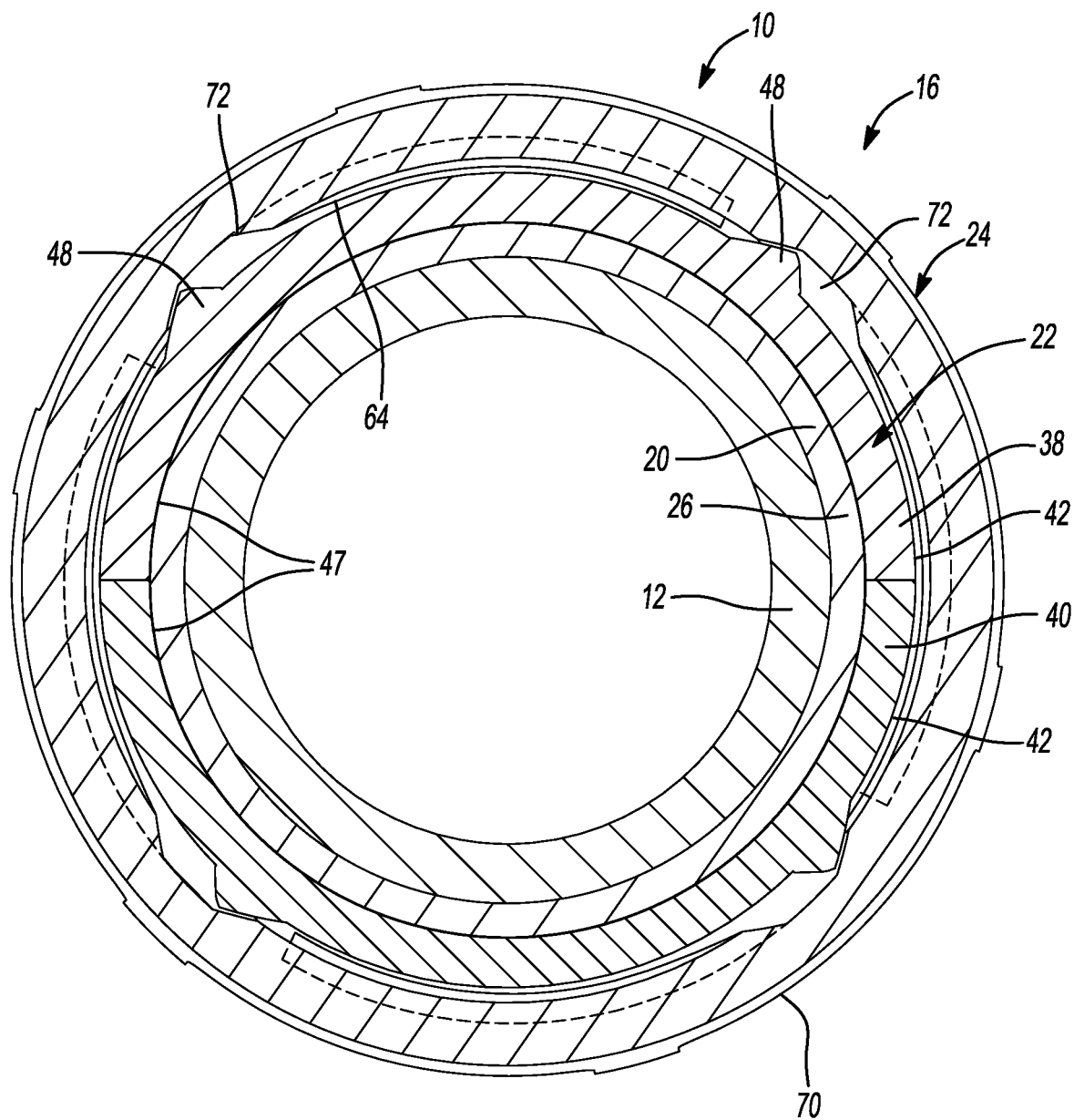
FIG. 9 is a cross-sectional view of the coupling assembly taken along line 9-9 of FIG. 7.
Figure 11:
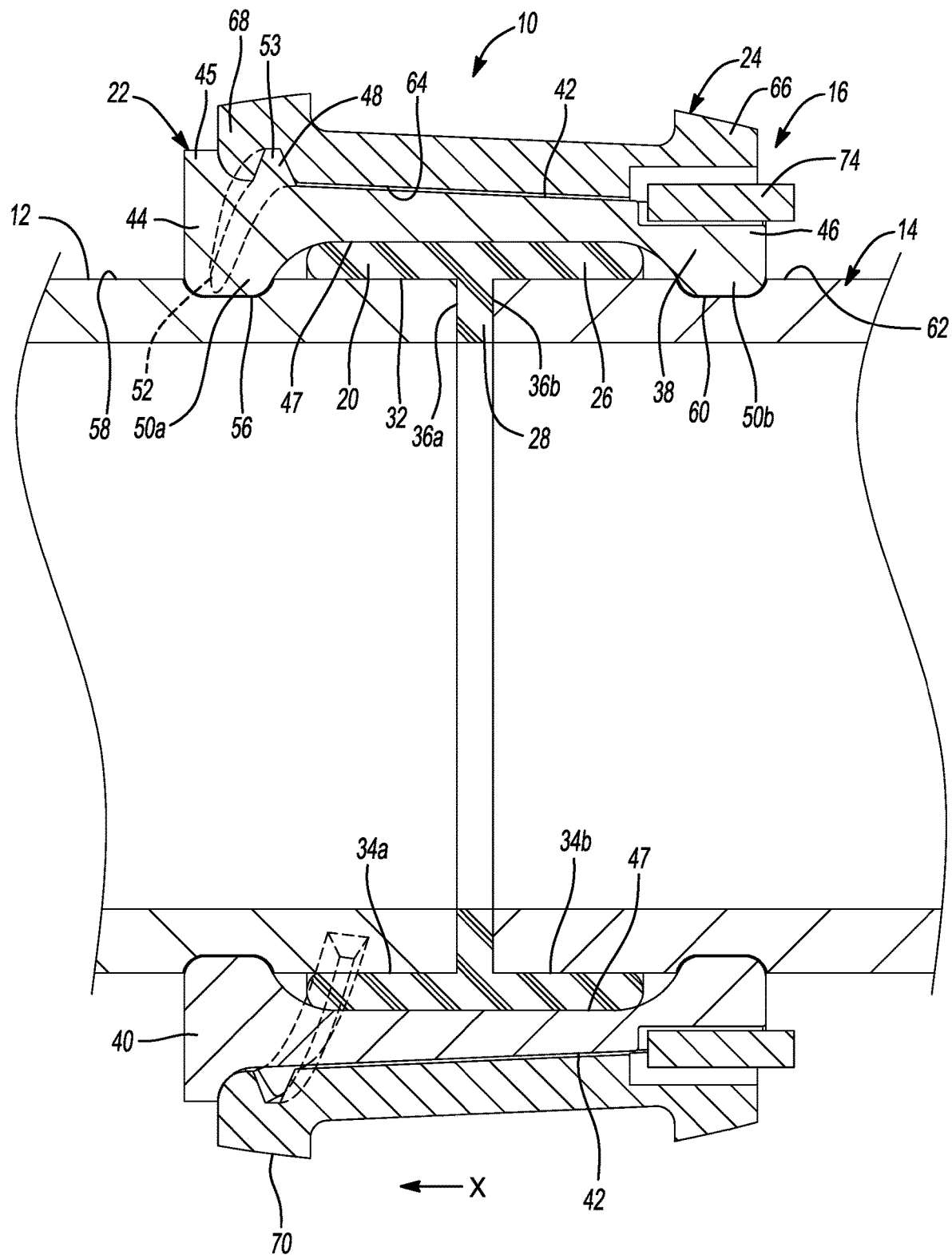
FIG. 11 is a cross-sectional view of the coupling assembly taken along line 11-11 of FIG. 10.
Figure 12:
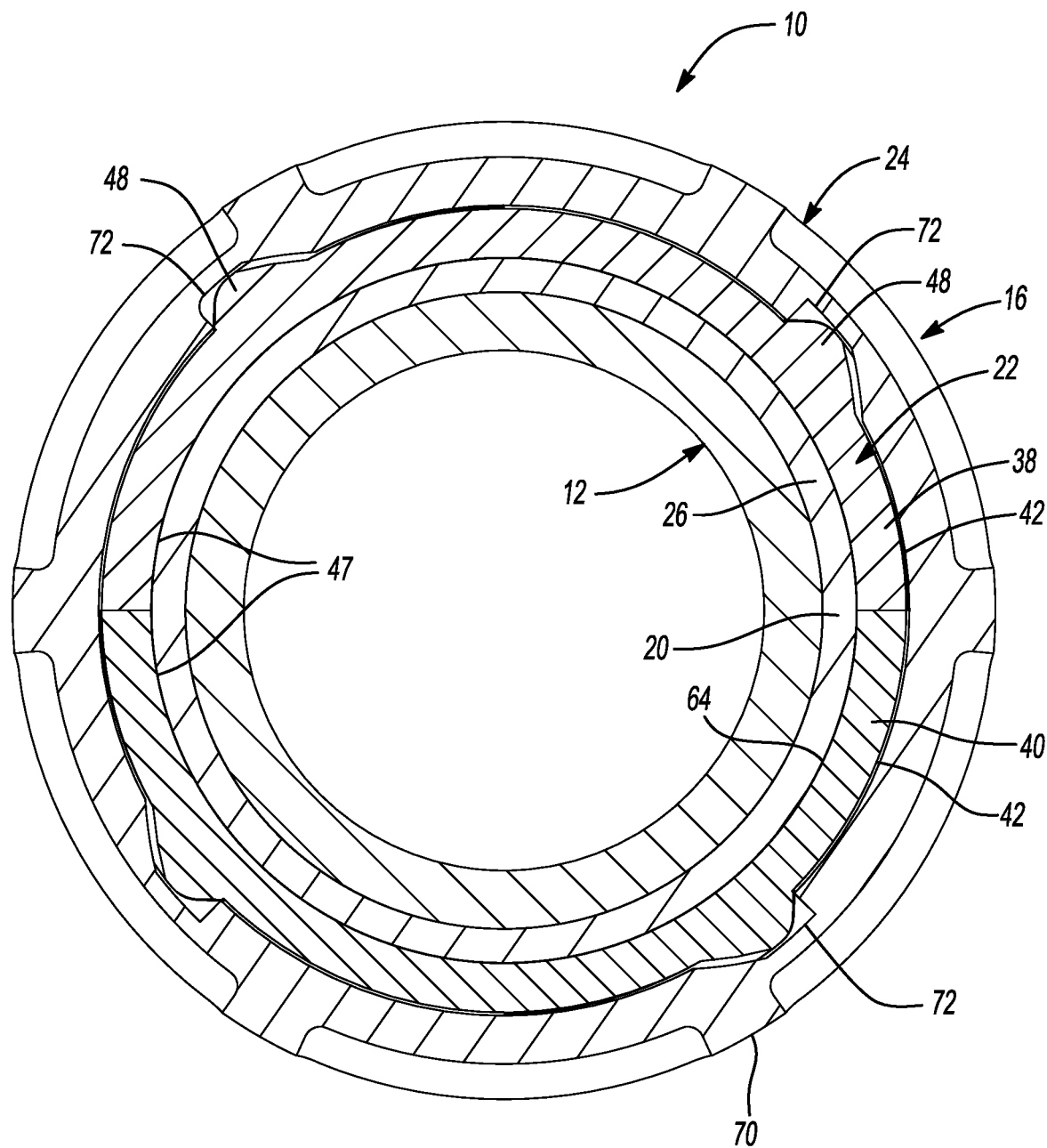
FIG. 12 is another cross-sectional view of the coupling assembly in the locked position.
Figure 13:
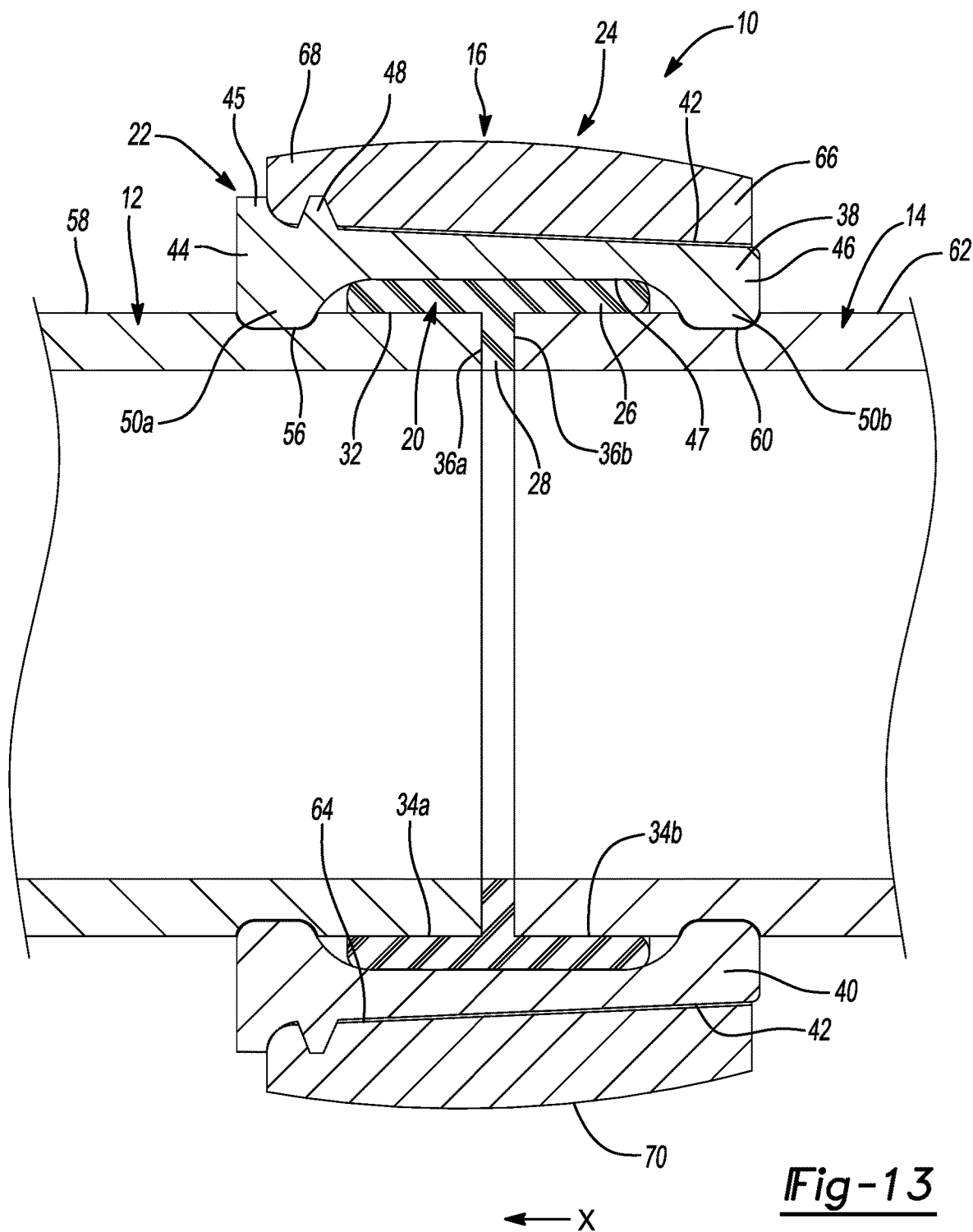
FIG. 13 is another cross-sectional view of the coupling assembly in the locked position.
Figure 14:
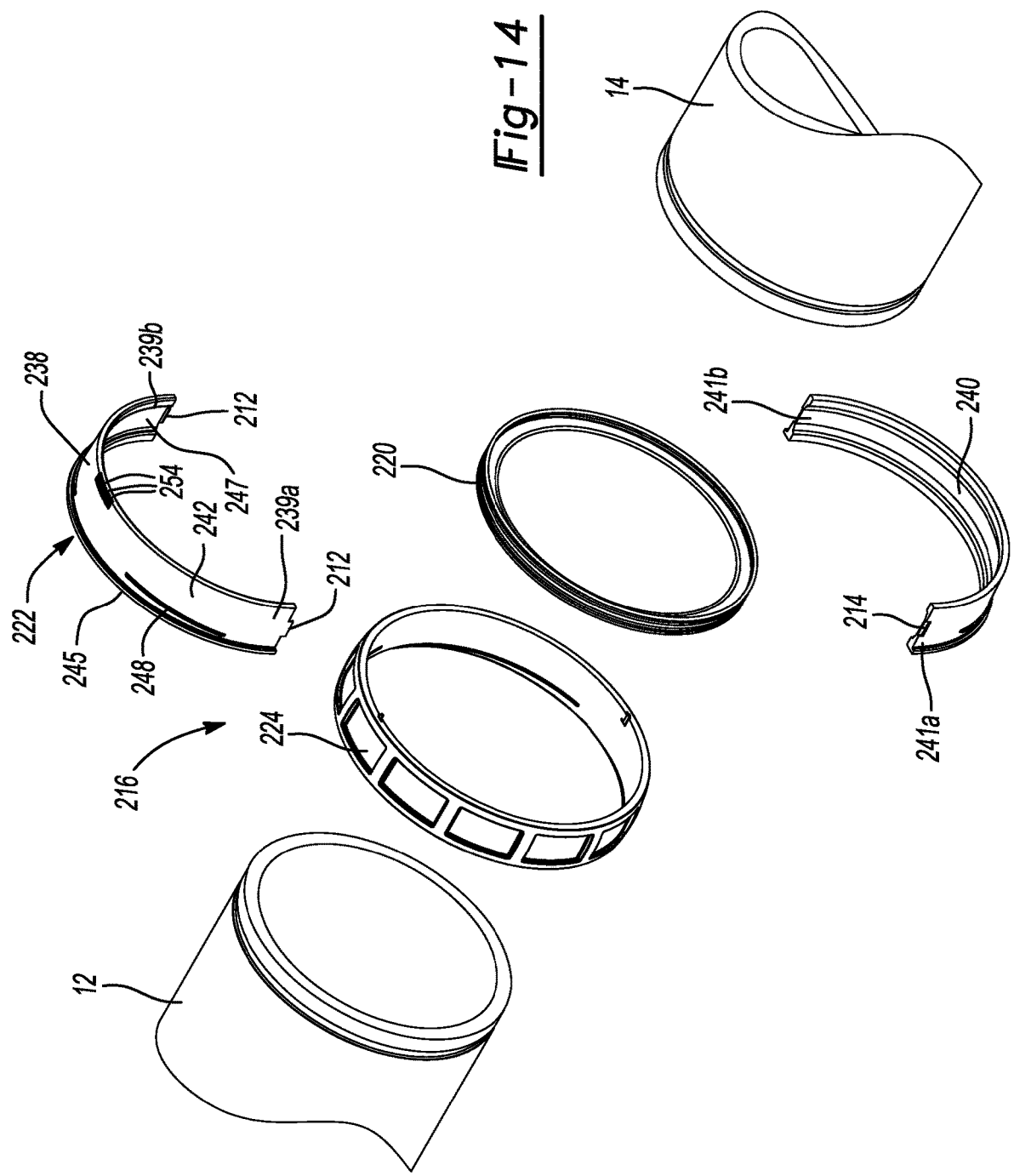
FIG. 14 is an exploded view of another coupling assembly.
Figure 15:
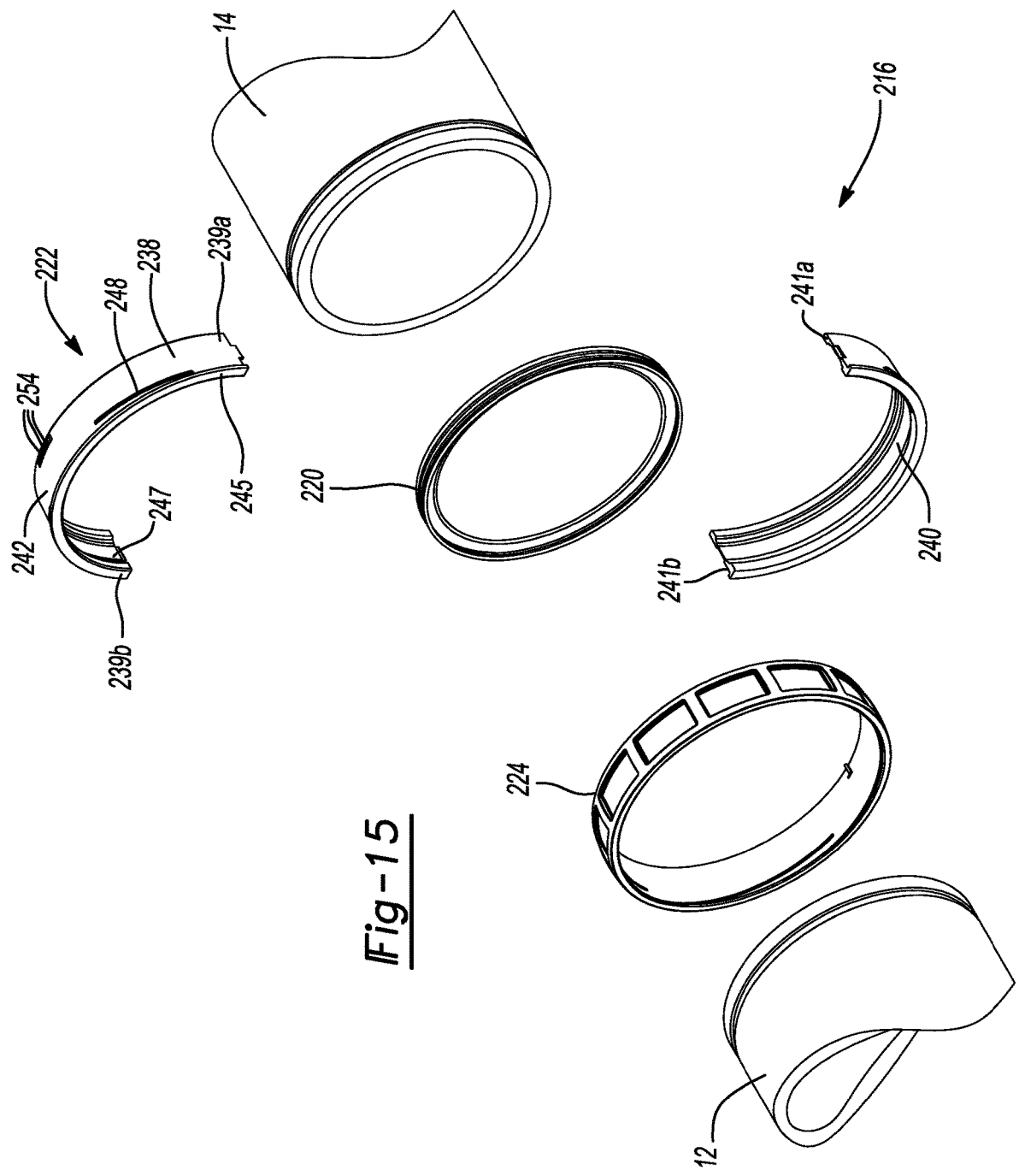
FIG. 15 is another exploded view of the coupling assembly of FIG. 14.

The partition 28 extends radially inwardly from and around an inner circumferential surface 32 of the body 26 and is positioned between the first pipe 12 and the second pipe 14 (FIGS. 7, 11, and 13). The partition 28 separates a first region 34a of the gasket 20 and a second region 34b of the gasket 20. In this way, the first pipe 12 extends into the first region 34a of the gasket 20 and seal is engaged with the partition 28 (the first pipe 12 seal is engaged with a first side 36a of the partition 28), and the second pipe 14 extends into the second region 34b of the gasket 20 and seal is engaged with the partition 28 (the second pipe 14 seal is engaged with a second side 36b of the partition 28).

The locking collar 22 is made of a polymeric material and surrounds the gasket 20. The locking collar 22 also includes a first or upper shell 38 and a second or lower shell 40 that cooperate to define a circular-shape. The first and second shells 38, 40 may be held together or supported by the retaining sleeve 24. Additionally or alternatively, the first and second shells 38, 40 may be mechanically fastened to each other such as by snap fit. As shown in FIGS. 7, 11, and 13, each of the first and second shells 38, 40 includes a tapered outer circumferential surface 42 (the outer circumferential surface 42 is tapered from a first axial end 44 of the shell 38, 40 toward a second axial end 46 of the shell 38, 40) and an inner circumferential surface 47. Each of the first and second shells 38, 40 also includes a lip 45, projections 50a, 50b, one or more arcuate shaped external threads or ribs 48, and a plurality of grooves 54.

The lip 45 extends radially outwardly from the tapered outer circumferential surface 42 at the first axial end 44. The projection 50a extends radially inwardly from the inner circumferential surface 47 into an annular groove 56 formed in an outer circumferential surface 58 of the first pipe 12 (FIGS. 7, 11, and 13; the projection 50a extends radially inwardly from the inner circumferential surface 47 at the first axial end 44 of the shell 38, 40). Similarly, the projection 50b extends radially inwardly from the inner circumferential surface 47 into an annular groove 60 formed in an outer circumferential surface 62 of the second pipe 14 (FIGS. 7, 11, and 13; the projection 50b extends radially inwardly from the inner circumferential surface 47 at the second axial end 46 of the shell 38, 40).

Figure 2:
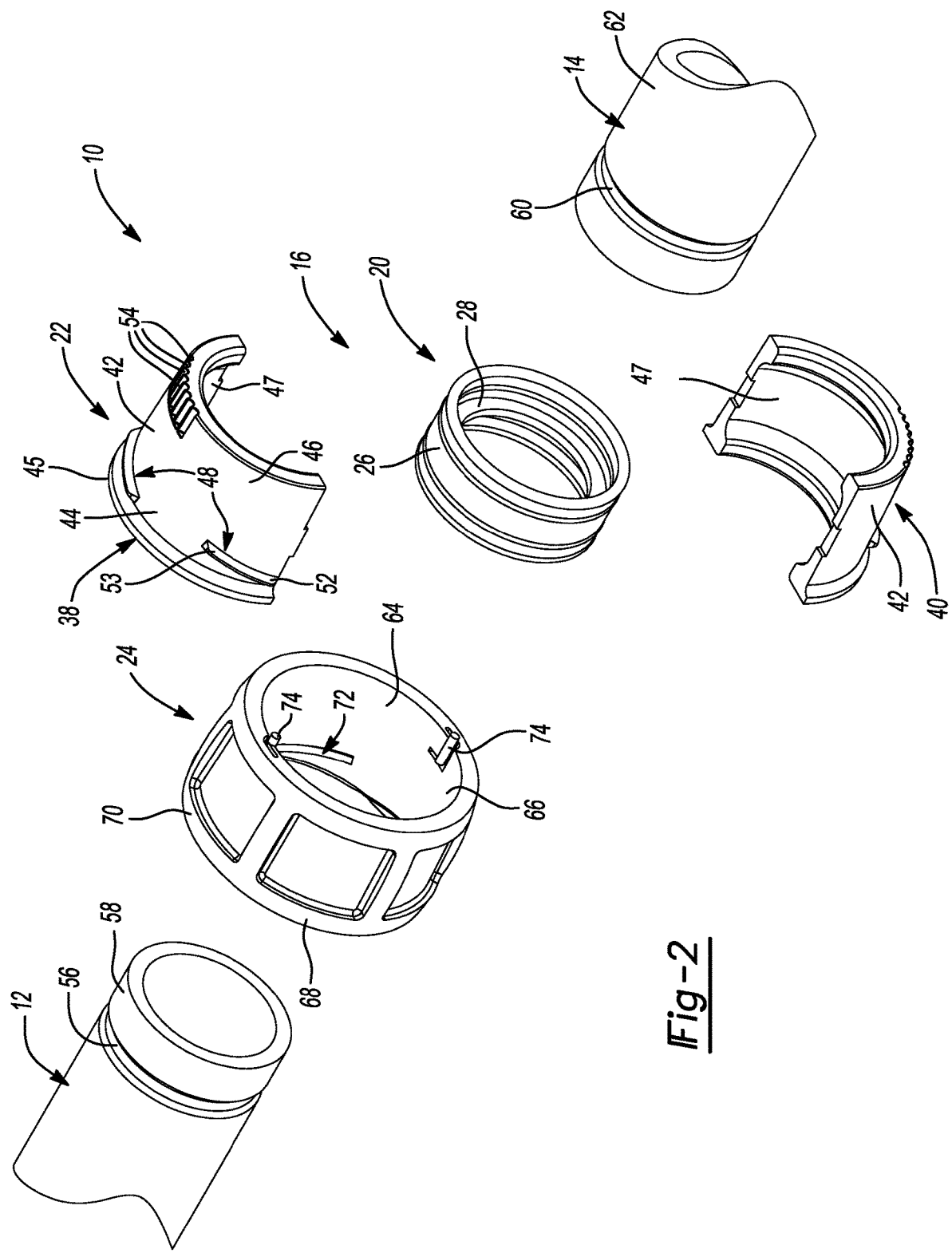
FIG. 2 is an exploded view of the coupling assembly of FIG. 1.
Figure 3:
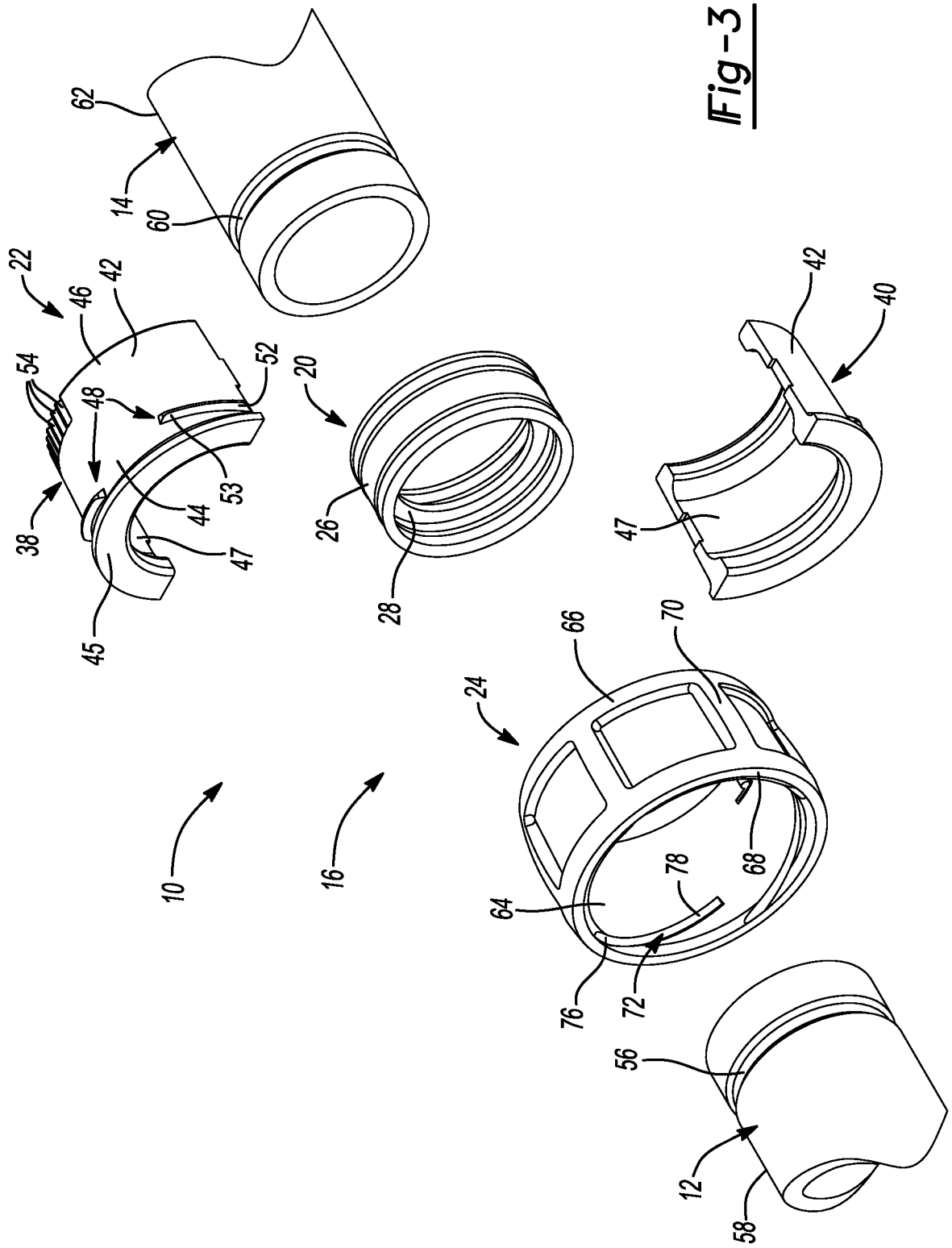
FIG. 3 is another exploded view of the coupling assembly of FIG. 1.

As shown in FIGS. 2-5, 7, 9 and 11-13, the external threads 48 are formed on the tapered outer circumferential surface 42 of the shells 38, 40 and include a first end 52 and a second end 53 (FIGS. 2 and 3). The external threads 48 extend from the first axial end 44 of the locking collar 22 toward the second axial end 46 of the locking collar 22 as the external threads 48 extend from the first end 52 toward the second end 53. Stated differently, the first end 52 of the external threads 48 is closer to the first axial end 44 of the locking collar 22 than the second end 53 of the external threads 48, and the second end 53 of the external threads 48 is closer to the second axial end 46 of the locking collar 22 than the first end 52 of the external threads 48.

The plurality of grooves 54 are formed in the tapered outer circumferential surface 42 of the shells 38, 40 near or at the second axial end 46 of the shells 38, 40. The grooves 54 extend in an axial direction and are adjacent to each other (no space or minimal space between the grooves 54). In some configurations, the grooves 54 may be formed in the tapered outer circumferential surface 42 of the shells 38, 40 and may be spaced apart from each other.

The retaining sleeve 24 is made of a polymeric material and slidably engages the locking collar 22. The retaining sleeve 24 is rotatable between an unlocked position (FIGS. 6-9) in which the gasket 20 seal is disengaged from the locking collar 22 and the first and second pipes 12, 14, and a locked position (FIGS. 10-13) in which the external threads 48 of the locking collar 22 and the retaining sleeve 24 cooperate to move the retaining sleeve 24 axially along the locking collar 22 so that the gasket 20 seal is engaged with the locking collar 22 and the first and second pipes 12, 14.

As shown in FIGS. 2, 3 and 7-13, the retaining sleeve 24 includes a tapered inner circumferential surface 64 (the inner circumferential surface 64 is tapered from a first axial end 66 of the retaining sleeve 24 toward a second axial end 68 of the retaining sleeve 24) and an outer circumferential surface 70. When the retaining sleeve 24 is slidably engaged onto the locking collar 22, the tapered inner circumferential surface 64 engages the tapered outer circumferential surface 42 of the locking collar 22. The retaining sleeve 24 also includes one or more arcuate shaped internal threads or grooves 72 and a plurality of cylindrically-shaped nubs or protuberances 74.

The internal threads 72 are formed in the tapered inner circumferential surface 64 of the retaining sleeve 24 and are configured to receive respective external threads 48 of the locking collar 22. In this way, when the retaining sleeve 24 is rotated from the unlocked position toward the locked position, the external threads 48 and the internal threads 72 cooperate to move the retaining sleeve 24 axially along the locking collar 22 (the tapered inner circumferential surface 64 moves along the tapered outer circumferential surface 42 of the locking collar 22). This forces the locking collar 22 radially inwardly so that the gasket 20 seal is engaged with the locking collar 22 and the first and second pipes 12, 14. Stated differently, when the locking collar 22 is forced radially inwardly, a seal is created between the gasket 20 and the inner circumferential surface 47 of the locking collar 22, the outer circumferential surface 58 of the first pipe 12, and the outer circumferential surface 62 of the second pipe 14. In this way, fluid flowing through the pipe assembly 10 is prevented from leaking out through the coupling assembly 16.

As shown in FIG. 3, the internal threads 72 include a first end 76 and a second end 78. The internal threads 72 extend from the second axial end 68 of the retaining sleeve 24 toward the first axial end 66 of the retaining sleeve 24 as the internal threads 72 extend from the first end 76 toward the second end 78. Stated differently, the first end 76 of the internal threads 72 is closer to the second axial end 68 of the retaining sleeve 24 than the second end 78 of the internal threads 72, and the second end 78 of the internal threads 72 is closer to the first axial end 66 of the retaining sleeve 24 than the first end 76 of the internal threads 72.

Figure 10:
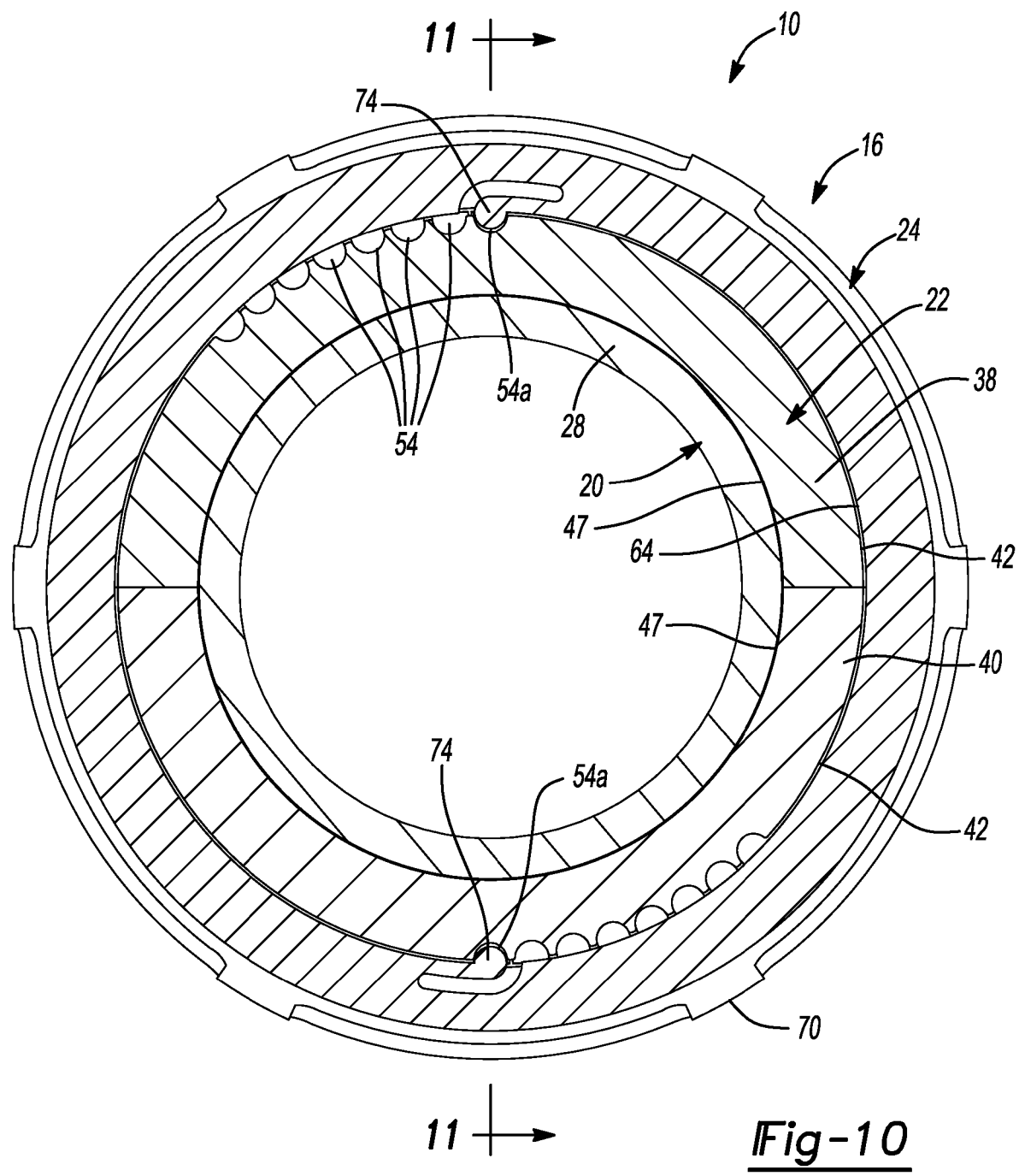
FIG. 10 is a cross-sectional view of the coupling assembly in a locked position.

The nubs 74 are formed on the tapered inner circumferential surface 64 of the retaining sleeve 24 near or at the first axial end 66 of the retaining sleeve 24. Each nub 74 engages the tapered outer circumferential surface 42 when the retaining sleeve 24 is in the unlocked position (FIG. 8) and is received in an outer groove 54a of the plurality of grooves 54 when the retaining sleeve 24 is in the locked position (FIG. 10). The retaining sleeve 24 is allowed to move in the axial direction relative to the locking collar 22 when the nub 74 engages the outer circumferential surface 42 and is prevented from moving in the axial direction relative to the locking collar 22 when the nub 74 is in the outer groove 54a (the nub 74 is interference fit with the locking collar 22 when received in the outer groove 54a). In some configurations, when the retaining sleeve 24 is in the unlocked position, the nubs 74 may be received in one of the grooves 54 instead of being engaged with the outer circumferential surface 42.

When the retaining sleeve 24 is rotated from the unlocked position toward the locked position, the nubs 74 move along the grooves 54 toward the groove 54a. In some configurations, when the plurality of grooves 54 are spaced apart from each other, the nubs 74 may move from the outer circumferential surface 42 directly to the groove 54a without moving along any grooves.

Figure 4:
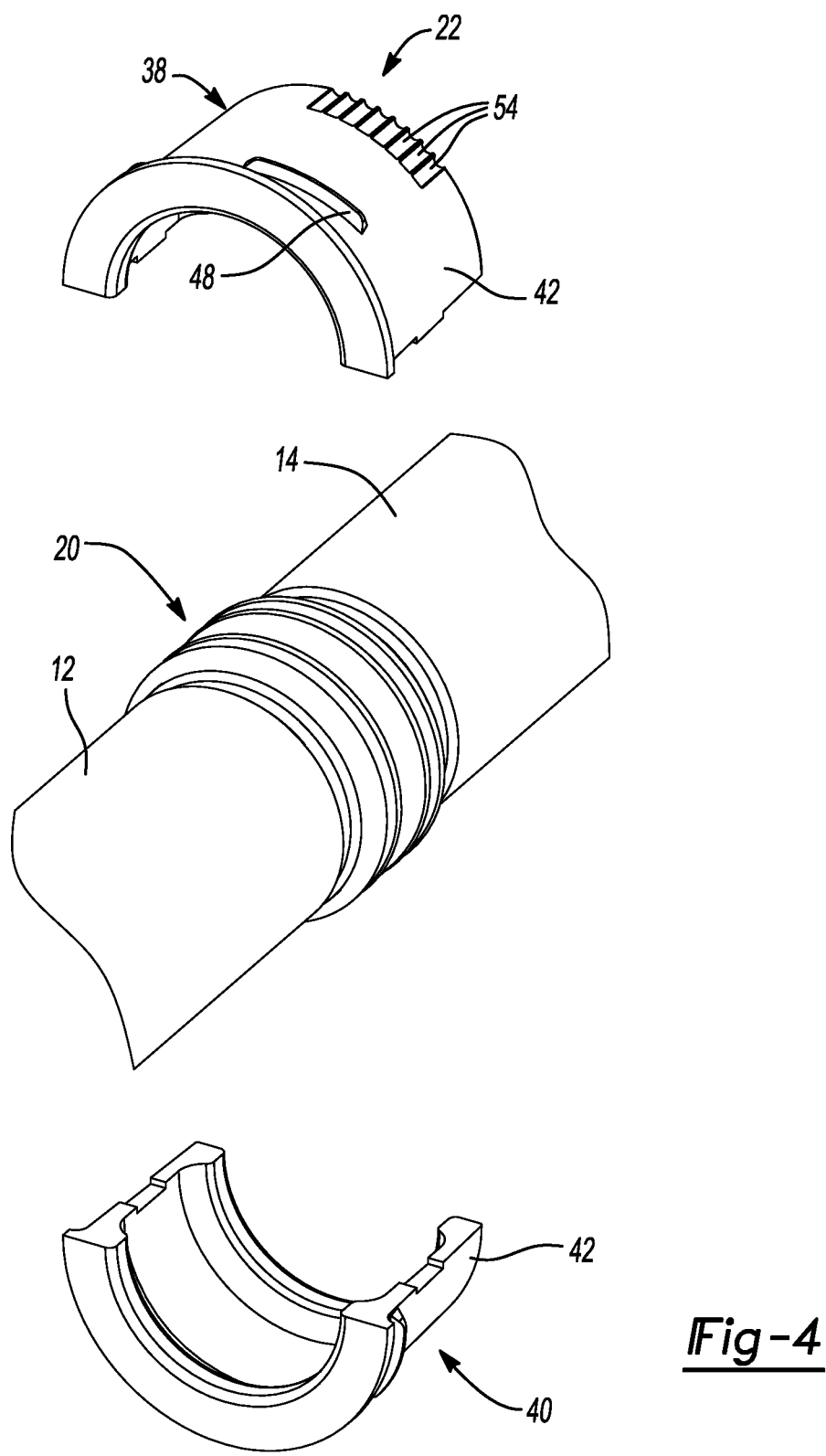
FIG. 4 is a perspective view showing a gasket of the coupling assembly disposed between the first and second pipes.

With continued reference to FIGS. 1-13, assembly of the pipe assembly 10 will now be described in detail. First, as shown in FIG. 4, the gasket 20 is disposed between the first pipe 12 and the second pipe 14.

Figure 5:
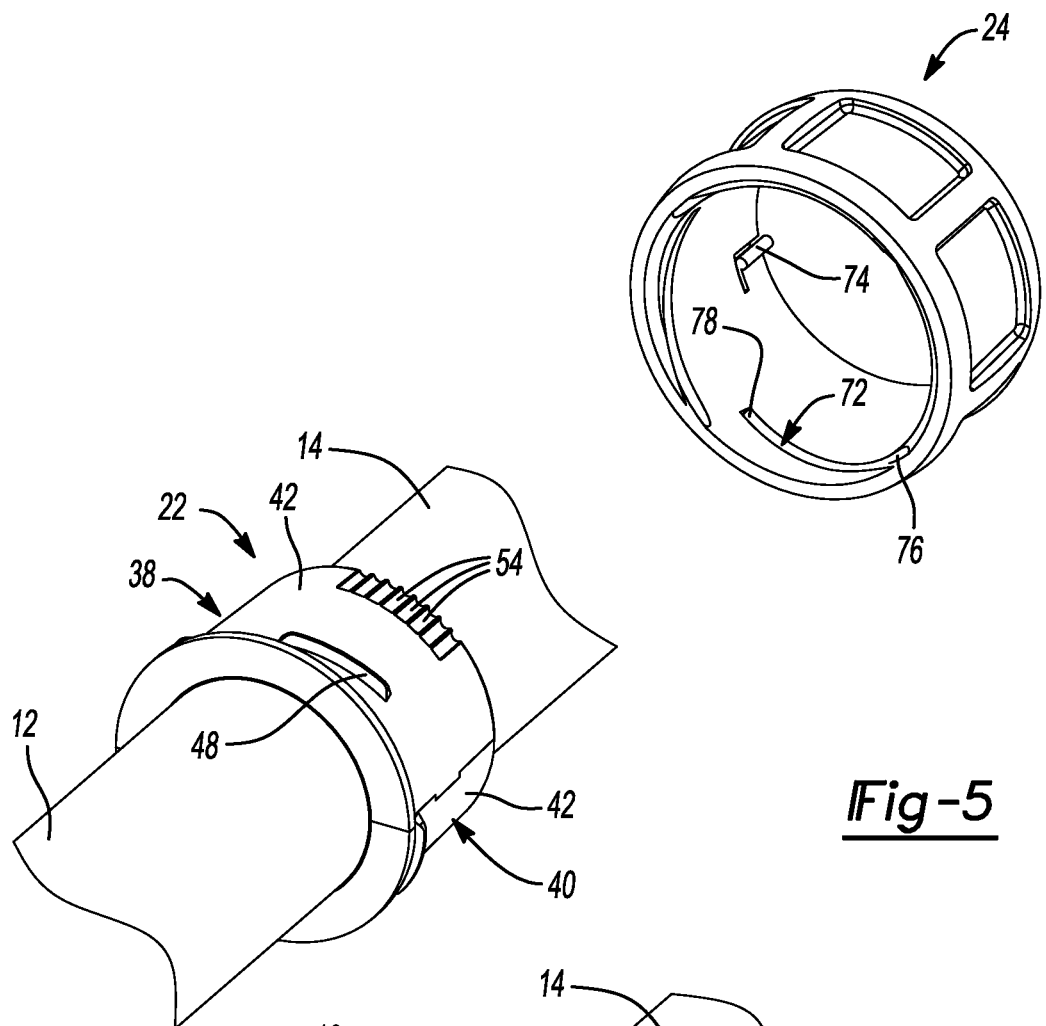
FIG. 5 is a perspective view showing a locking collar of the coupling assembly disposed around the gasket.
Figure 6:
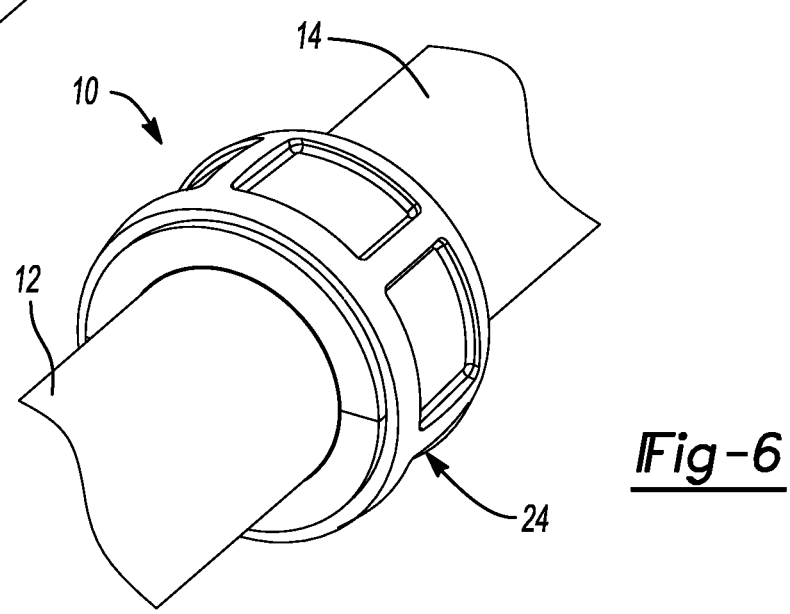
FIG. 6 is a perspective view showing a retaining sleeve of the coupling assembly slidably engaged onto the locking collar and the coupling assembly.

Next, as shown in FIG. 5, the first and second shells 38, 40 of the locking collar 22 are disposed around the gasket 20. The shells 38, 40 may be held in place around the gasket 20 by a tool or the hand of the assembler.

Next, as shown in FIGS. 6-9, the retaining sleeve 24 is slid over the locking collar 22 such that the tapered inner circumferential surface 64 of the retaining sleeve 24 engages the tapered outer circumferential surface 42 of the locking collar 22. When the retaining sleeve 24 is slid over the locking collar 22, the nubs 74 of the retaining sleeve 24 engage the outer circumferential surface 42 of the locking collar 22 and the external threads 48 of the locking collar 22 mate with respective internal threads 72 of the retaining sleeve 24.

Finally, as shown in FIGS. 10-13, the retaining sleeve 24 is rotated to the locked position in which the gasket 20 seal is engaged with the locking collar 22 and the first and second pipes 12, 14. The lip 45 of the locking collar 22 may act as a stop to prevent the retaining sleeve 24 from moving in a first axial direction X when the retaining sleeve 24 is in the locked position. The interference fit between the nubs 74 and the locking collar 22 prevent the retaining sleeve 24 from moving in the axial direction when the retaining sleeve 24 is in the locked position.

The coupling assembly 16 disclosed in the present disclosure provides the benefit of attaching the first pipe 12 and the second pipe 14 without using any fasteners (e.g., bolts, screws, rivets). The locking collar 22 and the retaining sleeve 24 of the coupling assembly 16 disclosed in the present disclosure is made out of a polymeric material which avoids corrosion and provides for a light weight coupling assembly 16 as compared to heavy metal couplers. Also, the coupling assembly 16 conveniently and quickly attaches the first pipe 12 and the second pipe 14 to each other without the need to mechanically bond parts of the coupling assembly 16 to each other and/or to the pipes 12, 14.

With reference to FIGS. 14-18, another coupling assembly 216 is provided. The coupling assembly 216 may be used to attach pipes 12, 14 instead of coupling assembly 16. The structure and function of the coupling assembly 216 may be similar or identical to that of the coupling assembly 16 described above, apart from any exception noted below.

The coupling assembly 216 includes a gasket 220, an annular locking collar 222, and an annular retaining sleeve 224. The structure and function of the gasket 220 may be similar or identical to the gasket 20 described above, and therefore, will not be described again in detail.

Figure 16:
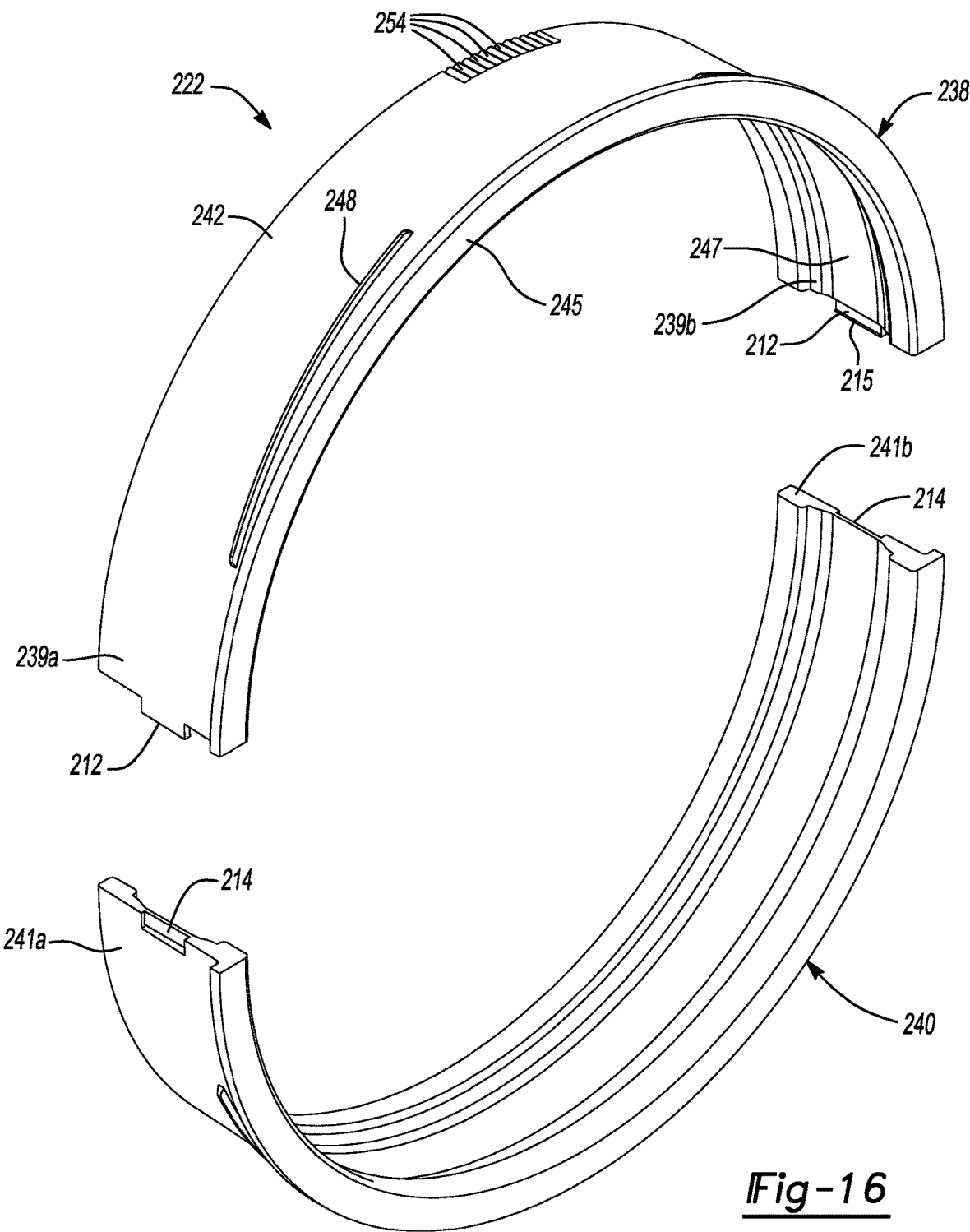
FIG. 16 is an exploded view of a locking collar of the coupling assembly of FIG. 14.
Figure 17:
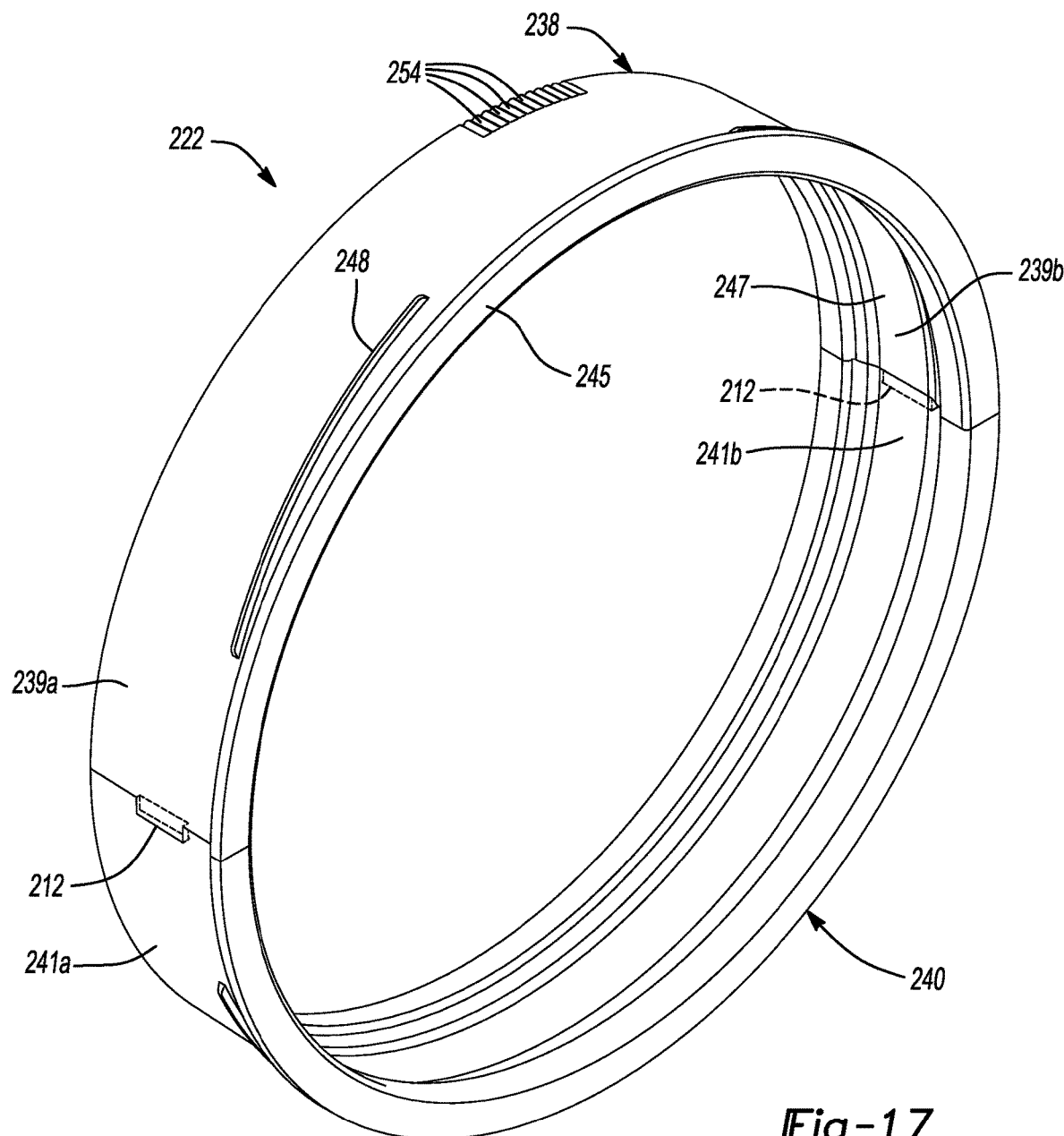
FIG. 17 is a perspective view of the locking collar of FIG. 16 assembled.
Figure 18:
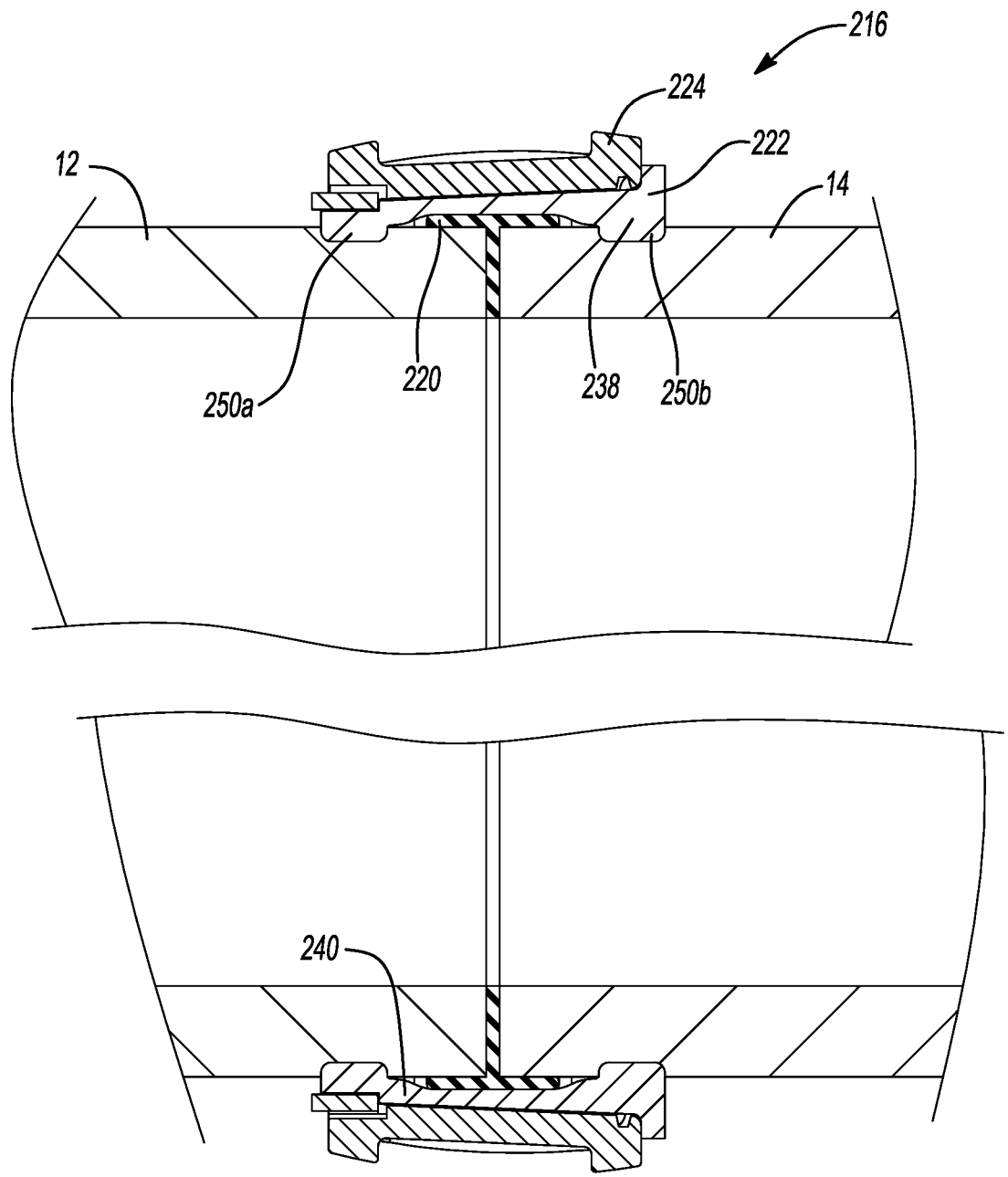
FIG. 18 is a cross-sectional view of the coupling assembly of FIG. 14 in a locked position.

With reference to FIGS. 16 and 17, the locking collar 222 surrounds the gasket 220 (FIG. 18) and includes a first or upper shell 238 and a second or lower shell 240 that cooperate to define a circular-shape. The first shell 238 may include a first end portion or edge 239a that is snap fit with a first end portion or edge 241a of the second shell 240, and a second end portion or edge 239b that is snap fit with a second end portion or edge 241b of the second shell 240. That is, each of the first and second end portions 239a, 239b of the first shell 238 includes a flexible tab 212 extending therefrom and each of the first and second end portions 241a, 241b of the second shell 240 includes a groove 214 formed therein. In this way, a protrusion 215 (FIG. 16) of the flexible tab 212 is received in a respective groove 214, thereby snap fitting the first and second shells 238, 240 to each other.

Each of the first and second shells 238, 240 includes a tapered outer circumferential surface 242, an inner circumferential surface 247, a lip 245, projections 250a, 250b, one or more arcuate shaped external threads or ribs 248, and a plurality of grooves 254. The structure and function of the tapered outer circumferential surface 242, the inner circumferential surface 247, the lip 245, the projections 250a, 250b, the external threads 248, and the plurality of grooves 254 may be similar or identical to that of the tapered outer circumferential surface 42, the inner circumferential surface 47, the lip 45, the projections 50a, 50b, the external threads 48, and the plurality of grooves 54, respectively, described above, and therefore, will not be described again in detail.

The structure and function of the retaining sleeve 224 may be similar or identical to the retaining sleeve 24 described above, and therefore, will not be described again in detail.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A coupling assembly for attaching a first pipe and a second pipe to each other, the coupling assembly comprising:
   an annular locking collar including a body and a plurality of external threads, the plurality of external threads formed on an outer circumferential surface of the body;
   a gasket positioned between the first and second pipes, and the locking collar; and
   an annular retaining sleeve surrounding the locking collar and including a plurality of internal threads formed in an inner circumferential surface of the retaining sleeve, each internal thread configured to receive a respective external thread of the locking collar,
   wherein the retaining sleeve is rotatable between an unlocked position in which the gasket seal is disengaged from the locking collar and the first and second pipes, and a locked position in which the external threads and the internal threads cooperate to move the retaining sleeve axially along the locking collar so that the gasket seal is engaged with the locking collar and the first and second pipes; and
   wherein the locking collar includes an upper shell and a lower shell that cooperate to form a circular shape, and wherein the upper shell and the lower shell are snap fit to each other.

2. The coupling assembly of claim 1, wherein a nub is formed on the inner circumferential surface of the retaining sleeve and a plurality of grooves are formed in the outer circumferential surface of the body, and wherein the nub engages the outer circumferential surface of the body when the retaining sleeve is in the unlocked position and is received in one groove of the plurality of grooves when the retaining sleeve is in the locked position.

3. The coupling assembly of claim 2, wherein the retaining sleeve is allowed to move in an axial direction relative to the locking collar when the nub engages the outer circumferential surface of the body and is prevented from moving in the axial direction relative to the locking collar when the nub is in the one groove.

4. The coupling assembly of claim 1, wherein the outer circumferential surface of the body of the locking collar and the inner circumferential surface of the retaining sleeve are tapered.

5. The coupling assembly of claim 4, wherein when the retaining sleeve is rotated from the unlocked position toward the locked position, the tapered outer circumferential surface moves along the tapered inner circumferential surface which forces the locking collar radially inwardly so that the gasket seal is engaged with the locking collar and the first and second pipes.

6. The coupling assembly of claim 1, wherein the locking collar and the retaining sleeve are made of a polymeric material.

7. The coupling assembly of claim 1, wherein the plurality of external threads and the plurality of internal threads are arcuate.

8. A coupling assembly for attaching a first pipe and a second pipe to each other, the coupling assembly comprising:
   an annular locking collar including:
      a body;
      a plurality of arcuate external threads formed on a tapered outer circumferential surface of the body; and
      a plurality of axially extending grooves formed in the tapered outer circumferential surface of the body;
   a gasket positioned between the first and second pipes, and the locking collar; and
   an annular retaining sleeve surrounding the locking collar and including:
      a plurality of arcuate internal threads formed in a tapered inner circumferential surface of the retaining sleeve and configured to receive respective external threads of the locking collar; and
      an axially extending protuberance formed on the inner circumferential surface of the retaining sleeve,
   wherein the retaining sleeve is rotatable between an unlocked position in which the gasket seal is disengaged from the locking collar and the first and second pipes, and a locked position in which the external threads and the internal threads cooperate to move the retaining sleeve axially along the locking collar so that the gasket seal is engaged with the locking collar and the first and second pipes,
   wherein the protuberance engages the outer circumferential surface of the body when the retaining sleeve is in the unlocked position and is received in one groove of the plurality of grooves when the retaining sleeve is in the locked position, and
   wherein when the retaining sleeve is rotated from the unlocked position toward the locked position, the tapered outer circumferential surface moves along the tapered inner circumferential surface which forces the locking collar radially inwardly so that the gasket seal is engaged with the locking collar and the first and second pipes.

9. The coupling assembly of claim 8, wherein the retaining sleeve is allowed to move in an axial direction relative to the locking collar when the protuberance engages the outer circumferential surface of the body and is prevented from moving in the axial direction relative to the locking collar when the protuberance is in the one groove.

10. The coupling assembly of claim 9, wherein when the retaining sleeve is in the locked position, the protuberance and the one groove include an interference fit.

11. The coupling assembly of claim 8, wherein the locking collar includes an upper shell and a lower shell that cooperate to form a circular shape, and wherein the upper shell and the lower shell are supported by the retaining sleeve.

12. The coupling assembly of claim 8, wherein the plurality of grooves are positioned at an axial end of the body of the locking collar and the protuberance is positioned at an axial end of the retaining sleeve.

13. The coupling assembly of claim 8, wherein the external threads include a first end and a second end and the locking collar includes a first axial end and a second axial end, and wherein the external threads extend from the first axial end of the locking collar toward the second axial end of the locking collar as the external threads extend from the first end toward the second end.

14. The coupling assembly of claim 8, wherein the locking collar and the retaining sleeve are made of a polymeric material.

15. A method for attaching a first pipe and a second pipe to each other, the method comprising:
providing a gasket between the first pipe and the second pipe;
providing a locking collar around the gasket, the locking collar including a body and a plurality of external threads formed on an outer circumferential surface of the body;
sliding a retaining sleeve over the locking collar, the retaining sleeve including a plurality of internal threads formed in an inner circumferential surface of the retaining sleeve and configured to receive respective external threads of the locking collar; and
rotating the retaining sleeve between an unlocked position in which the gasket seal is disengaged from the locking collar and the first and second pipes, and a locked position in which the external threads and the internal threads cooperate to move the retaining sleeve axially along the locking collar so that the gasket seal is engaged with the locking collar and the first and second pipes; and
wherein a nub is formed on the inner circumferential surface of the retaining sleeve and a plurality of grooves are formed in the outer circumferential surface of the body, and wherein the nub engages the outer circumferential surface of the body when the retaining sleeve is in the unlocked position and is received in one groove of the plurality of grooves when the retaining sleeve is in the locked position.

16. The method of claim 15, wherein the retaining sleeve is allowed to move in an axial direction relative to the locking collar when the nub engages the outer circumferential surface and is prevented from moving in the axial direction relative to the locking collar when the nub is in the one groove.

17. The method of claim 15, wherein the outer circumferential surface of the body of the locking collar and the inner circumferential surface of the retaining sleeve are tapered.

18. The method of claim 17, wherein when the retaining sleeve is rotated from the unlocked position toward the locked position, the tapered outer circumferential surface moves along the tapered inner circumferential surface which forces the locking collar radially inwardly so that the gasket seal is engaged with the locking collar and the first and second pipes.

\* \* \* \* \*